Sept. 28, 1971     G. E. HINES     3,608,381
BALANCING MACHINE WITH DIRECT READOUT
Filed July 28, 1969     2 Sheets-Sheet 1
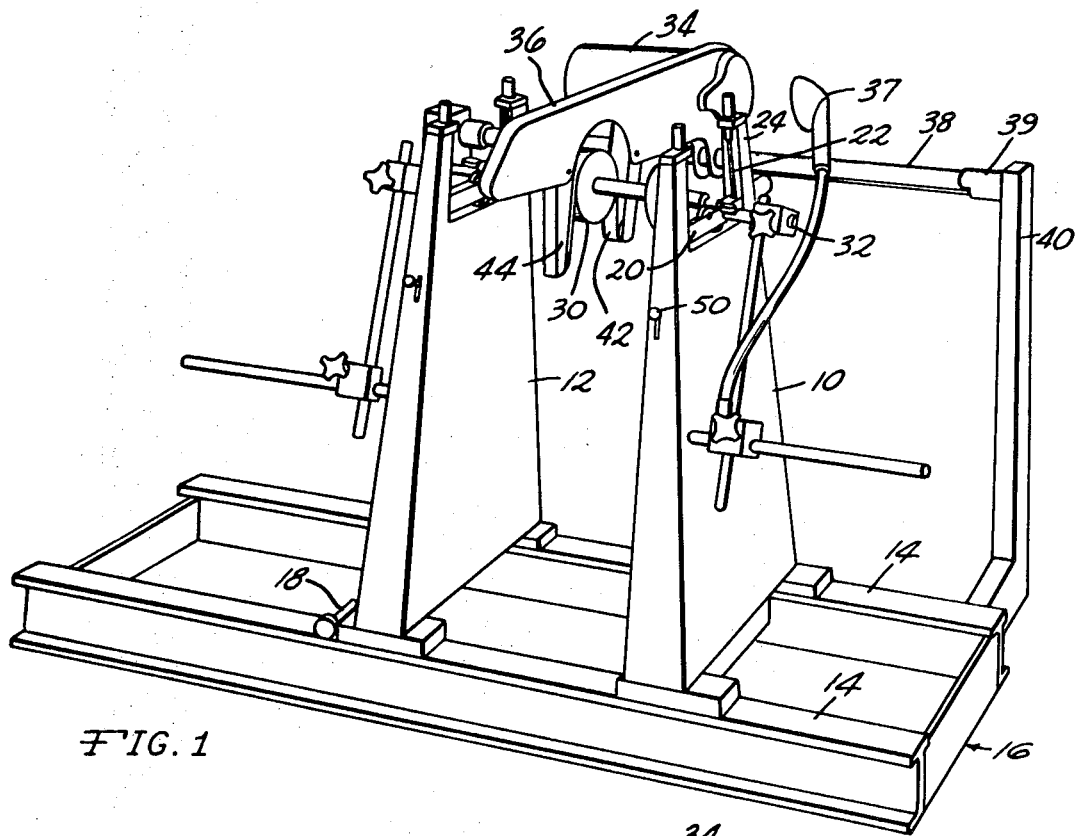
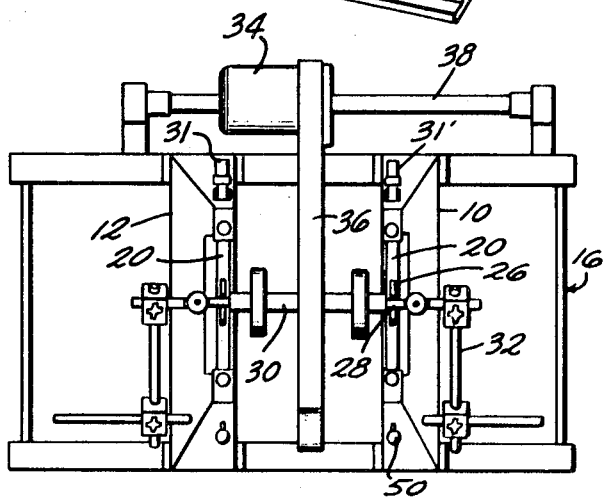
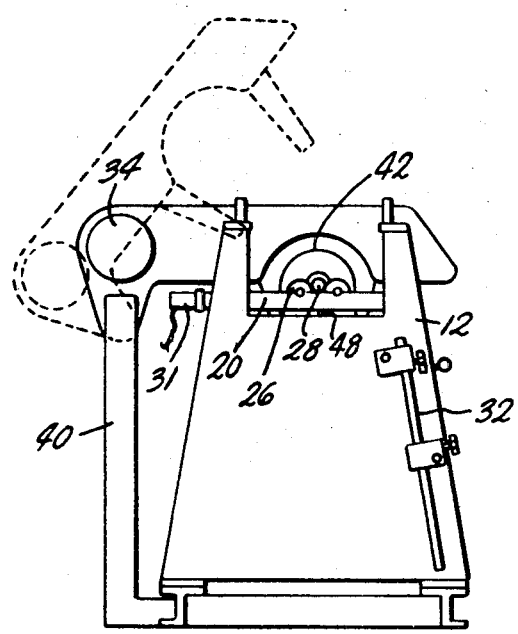
INVENTOR
GORDON E. HINES
BY
Barnes, Kisselle, Raisch & Choate
ATTORNEYS Sept. 28, 1971         G. E. HINES         3,608,381
BALANCING MACHINE WITH DIRECT READOUT
Filed July 28, 1969                    2 Sheets-Sheet 2
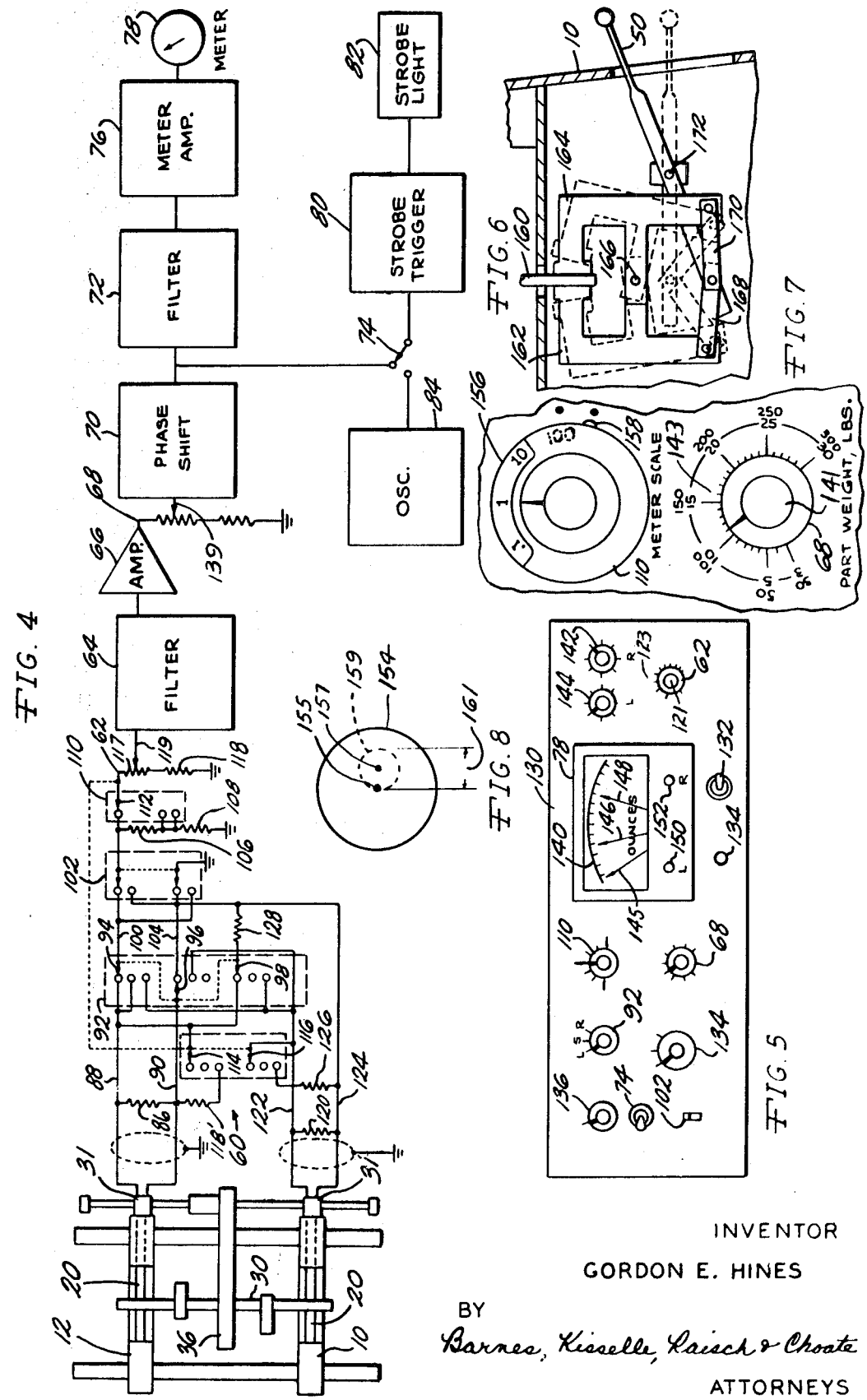
INVENTOR
GORDON E. HINES
BY
Barnes, Kisselle, Raisch & Choate
ATTORNEYS United States Patent Office 3,608,381
Patented Sept. 28, 1971

3,608,381
BALANCING MACHINE WITH DIRECT READOUT
Gordon E. Hines, Ann Arbor, Mich., assignor to Balance Technology, Inc., Ann Arbor, Mich.
Filed July 28, 1969, Ser. No. 845,250
Int. Cl. G01m 1/08
U.S. Cl. 73—462                                    15 Claims

ABSTRACT OF THE DISCLOSURE

A balancing machine wherein the translation of bearing carriers in response to vibration of a test part supported on the carriers is detected by pickups to develop two test signals that are processed to provide a direct indication of the weight to be added in a given correction plane at a given correction radius. The signal processing circuit includes a selector switch to select a signal from each pickup individually or the sum of the signals from both pickups. There is a meter scale switch to select full scale meter deflections depending upon the weight range of the part under test. The selected signals are also processed through a correction radius potentiometer and also a part weight potentiometer that are calibrated directly in inches and pounds, respectively, so that the meter directly reads the weight that has to be added at a given correction radius.

---

Balancing machines are available wherein the test part is supported on horizontally spaced apart bearing carriers. Translation of the carriers when the part vibrates develops a pair of output signals representing the amount of unbalance, either force (static) or moment (dynamic) unbalance, in the part. For force unbalance correction, the translation of both carriers is measured simultaneously and the force unbalance angle is determined by strobing. For moment unbalance correction or a combination of force and moment unbalance, one of the carriers is locked against translation; and, while the part is rotated, the translation of the other free carrier is measured and the unbalance angle is determined by conventional strobe techniques. The other carrier is then locked against translation; and while the part is rotated a second time, the translation at the first carrier is measured and the unbalance angle determined.

Typically, measurements of the carrier translations for either force unbalance or for moment unbalance may be obtained by mechanical-electrical transducers, and it is necessary to calibrate the electrical output of the transducers for each type of part under test. This calibration may be accomplished by using a perfectly balanced test part and then adding a known amount of unbalance in a selected correction plane. With a known unbalance, the output at each transducer can then be calibrated. This type of calibration is not particularly undesirable or inconvenient where the machine is used to test only one part as, for example, a given crankshaft coming off a production line. After an initial calibration for that crankshaft, the pickup outputs can be used to indicate the amount of weight that must be added in the given correction planes so long as the same type of crankshaft is under test. However, if the balancing machine is used to test other types of crankshafts, it must be recalibrated for each crankshaft. Hence for certain applications it is very desirable to have a balancing machine that does not have to be carefully calibrated each time a different part is used, for example, a balancing machine used in specialty shops that rebuild a wide variety of different types of crankshafts.

Among the objects of the present invention are to provide a balancing machine and a signal processing circuit for such machine that provides a direct indication of unbalance during initial rotation of the part under test without requiring trial weights or calibration runs; that can be operated simply by semi-skilled personnel to rapidly obtain precise information required to accurately balance a wide variety of parts; that eliminates time consuming and error introducing procedures compared to prior art machines; that is relatively low cost and yet versatile; and/or that provides fast operation with high accuracy for either or both one-of-a-kind or production balancing and for either force or moment unbalance correction or a combination thereof.

Other objects, features and advantages of the present invention will become apparent in connection with the following description, the appended claims and the accompanying drawings in which:

FIG. 1 is a perspective view of a balancing machine useful with the signal processing circuit of the present invention;

FIG. 2 is a top view of the balancing machine of FIG. 1;

FIG. 3 is an end view of the balancing machine taken from the left side as viewed in FIG. 1 with certain parts repositioned;

FIG. 4 is a circuit diagram, partly in schematic and partly in block form, of the processing circuit of the present invention;

FIG. 5 is an elevational view of the front of the control panel for the circuit of FIG. 4;

FIG. 6 is an elevational view of a locking mechanism to selectively hold bearing carriers in the balancing machine from translating when the part vibrates;

FIG. 7 is an enlarged view of a meter scale dial and part weight dial on the control panel of FIG. 5; and FIG. 8 is a diagram illustrating a balancing principle incorporated in the present invention.

Referring more particularly to FIGS. 1–3, the illustrated balancing machine generally comprises a pair of complementary, right-hand and left-hand stanchions 10 and 12 that are spaced apart horizontally and mounted on rails 14 of a base 16. Stanchion 10 is stationary whereas stanchion 12 is mounted on rails 14 for horizontal movement by suitable means such as a motor-driven pinion and rack (not shown) operated by lever 18 to adjust the horizontal spacing between the stanchions. Inasmuch as stanchions 10, 12 are substantially identical, only one of the stanchions and corresponding portions of the suspension system mounted thereon will be described in greater detail with like reference numerals identifying like parts on the stanchions 10, 12.

A bearing carrier 20 is suspended on stanchion 10 by a pair of flexible cables 22 that are rigidly fastened at their lower ends on opposite ends of carrier 20 and are vertically adjustably fastened at their upper ends on respective upright arms 24 on stanchion 10. Arms 24 are spaced apart laterally of the machine and project substantially above carrier 20. A pair of adjustable roller bearings 26 mounted on each carrier 20 rotatably support shaft end portions 28 of a test rotor 30. Adjustable end thrust retainers 32 are mounted on each of the stanchions 10, 12 outboard of the rotor 30 to engage the opposite ends of the rotor and prevent axial motion of the rotor. Retainers 32 have suitable bearings or rollers engaging rotor 30 to allow free rotation and oscillation thereof during testing. Conveniently, one of the retainers 32 serves as a support for a strobe light 37. Carriers 20 extend rearwardly through the stanchions and mounted directly on the rear end of the left and the right carriers 20 is a respective transducer pickup 31, 31' that moves with its respective carrier during translation thereof and provides an electrical output signal representing the displacement of the carrier. In the preferred embodiment, the pickups 31, 31' are inertia-type transducers known as a seismic pickup. Other suitable transducers could also be used, for example, the piezoelectric crystal pickups of the general type disclosed in U.S. Pat. 2,656,710 granted to I. A. Weaver et al. on Oct 27, 1953, and entitled "Means for Adjustment of Balancing Machines."

Rotor 30 is rotatably driven by a motor 34 mounted on the rear end of a drive arm 36 which in turn is mounted on a horizontal rod 38 journalled at 39 on uprights 40. Arm 36 extends radially outward from rod 38 toward the front of the machine and over rotor 30 when the arm is in the driving position illustrated in full lines. An endless belt 42 driven by motor 34 is housed in the arm 36 by a suitable arrangement of rollers mounted on the arm 36 and on pivoted, downwardly depending secondary arms 44, 45 disposed at opposite sides of rotor 30. The belt 42 travels downwardly on arms 44, 45 and upwardly over rotor 30 to revolve the rotor. A suitable rack and pinion (not shown) on arm 36 and rod 38 allow selective horizontal positioning of the arm depending on the configuration of the test part. The radial drive arm 36 and rod 38 can pivot as a unit to the raised position illustrated in dotted lines in FIG. 3 to disengage the drive from rotor 30. This also facilitates assembly and disassembly of rotor 30 on carriers 20 and other balancing operations such as adding weights to the rotor.

Although the pivoted drive arm 36 is useful in the preferred embodiment of the balancing machine being described, it will be understood that other suitable driving mechanism could also be used. The details of the drive mechanism including the drive arm 36 and the mounting of the belt 42 therein are disclosed in greater detail in my copending application filed concurrently with the present application and entitled "Drive Mechanism for Balancing Machine." Mounted inside stanchions 10 and 12 are locking clamps adapted to selectively engage a pin 48 journalled in and depending downwardly from the respective carriers 20. The clamps are operated by suitable levers 50 when it is desired to lock the carriers against horizontal translation, as will be explained more fully in connection with FIG. 6.

Referring more specifically to FIG. 4, the lefthand pickup 31 and the right-hand pickup 31' are connected to a switching circuit designated generally at 60. The output of the switching circuit 60 is developed across a radius correction potentiometer 62 (FIGS. 4 and 5) and fed from potentiometer 62 through a band pass filter 64 to an amplifier 66. The output of amplifier 66 is developed across a part weight potentiometer 68 (FIGS. 4 and 5) and applied to an adjustable phase shift circuit 70. The phase shifted output is in turn fed to a low pass filter 72 and to a selector switch 74. The filtered output from 72 in turn is fed through a meter amplifier 76 to a DC meter 78. With switch 74 in the position illustrated, the phase shifted signal from 70 is fed to a strobe trigger circuit 80 that fires the strobe light 82 (37, FIG. 1). Switch 74 is adapted to alternatively connect the strobe trigger circuit 80 to a reference oscillator 84 used to set the speed of motor 34.

In the preferred embodiment, rotor 30 is driven at 720 r.p.m. so that the output signals at pickups 31, 31' are at 12 cycles per second with the peak amplitude of the signal determined by the amount of unbalance and the phase determined by the angular location of the unbalance. Filter 64 is a narrow band pass filter that suppresses spurious low and high frequency signals, for example, low frequency noise from the suspension system and high frequency noise from the bearings and surface roughness. At 720 r.p.m. rotational speed, the band pass filter 64 may be from 9 to 15 c.p.s. The adjustable phase shift circuit 70 provides a variable 180° phase shift that is set at the factory so that during a generally conventional strobing operation the heavy spot on the rotor 30 will appear at either the top or bottom of the rotor. Filter 72 is a sharp cutoff, low-pass filter, for example, a filter having an upper cutoff frequency of 20 c.p.s. for a rotational speed of 720 r.p.m. Although it is not essential that the part be rotatated at 720 r.p.m., it is desirable to rotate the part at a particular predetermined speed compatible with the pass bands chosen for filters 64, 72 and correlated to the parameters of the phase shift circuit 70 to maintain the preset location of the heavy spot during strobing. The frequency should be in the range that is outside the mechanical resonance of the system, for example, the mechanical resonance of the suspension as well as mechanical resonance of the pickups 31, 31'. In general, these resonant frequencies are below 12 cycles per second and hence an operating r.p.m. of 720 was selected.

Referring more particularly to the switching circuit 60, the signal from the left pickup 31 is applied via a shielded cable across a load resistor 86. The signal developed across resistor 86 is fed via leads 88, 90, respectively, to a left-sum-right selector switch 92. Switch 92 (FIGS. 4 and 5) has three wipers 94, 96, 98, each of which is associated with a separate set of three contacts each, hereinafter designated as the upper, middle and lower contacts corresponding to the arrangement illustrated in FIG. 4. With switch 92 in the position illustrated, lead 88 is connected via the upper contact through wiper 94 and a lead 100 to a phase reversal switch 102. Similarly, lead 90 is connected through wiper 96 and the upper contact for wiper 96 through lead 104 to the reversing switch 102. Switch 102 has two wipers, each of which is associated with a separate set of two contacts and, via the crossover leads, is arranged to reverse the polarity of the signals appearing at the wipers in a manner that is apparent from the illustrated circuit.

The output from switch 102 is applied across a voltage divider formed by resistors 106, 108 in the input of a meter scale switch 110. Switch 110 includes a wiper 112 and three associated contacts, the upper of which connects the wiper across resistors 106, 108, whereas the middle and lower contacts connect the wiper 112 only across resistor 108. The meter scale switch 110 further includes a second wiper 114 and a third wiper 116 operated simultaneously with wiper 112 as illustrated by the broken line mechanical connection. Wipers 114, 116 are each associated with a respective set of three contacts. The lower contact for wiper 114 is connected through an attenuating resistor 118' to the lead 90 and across resistor 86. For reasons as will later be described in greater detail, in order to operate over a part weight range factor of 100 to 1, the signal developed at wiper 112 is attenuated by a factor of ten when wiper 112 is moved from the upper contact as illustrated to the middle contact. When wiper 112 is moved to its lower contact, resistor 118' is paralleled with resistor 86 via wiper 114 and its associated lower contact to further attenuate the signal by a second factor of ten. The output of switch 110 is then connected directly across the radius correction potentiometer 62 which includes resistors 117, 118 and wiper 119. Potentiometer 62 (wiper 119) is set by means of a manually operated knob 121 and a scale 123 (FIG. 5) calibrated directly in inches.

The output from the right pickup 31' is arranged to be connected in the switching circuit 60 in a manner similar to that for the output from the left pickup 31. The output from pickup 31' is developed across a load resistor 120 and leads 122, 124. Lead 122 is connected in the selector switch 92 to wiper 116, to the lower contacts for wipers 94, 98 and to the middle contact for wiper 96. The lead 124 is connected through an attenuating resistor 126 to the lower contact for the wiper 116 in switch 110 and to one input of the phase reversal switch 102.

By way of summarizing the switching circuit 60 described hereinabove, assuming switches 102, 110 remain in their illustrated positions, with wipers 94, 96, 98 engaging their upper contacts the signal across the correction radius potentiometer 62 will be a function of only the signal from pickup 31. When wipers 94, 96, 98 engage their middle contacts, the signal appearing across potentiometer 62 will be a function of the sum of the signals from both pickups 31, 31'. When wipers 94, 96, 98 are moved to their lower contacts, the signal across potentiometer 62 will be a function only of the output of the right pickup 31'. A resistor 128 connected to wiper 98 in the selector switch 92 serves to correlate the signal level for the pickups individually to the signal level for the sum of the outputs from both pickups. The value of resistor 128 is such that the sensitivity of meter 78 is constant for a given displacement of carriers 20 regardless of whether the signal at potentiometer 62 is a function of the one or both pickups 31, 31'. Assuming that switches 92 and 110 remain in the positions illustrated, switch 102 provides polarity or phase reversal of the output developed across potentiometer 62. In the preferred embodiment, the phase shift circuit 70 is factory set so that with switch 102 in the upper position (FIGS. 4 and 5) the unbalance is at the top of the part during a strobe operation to indicate that weight must be removed from that location (or added at a location 180° thereto). With switch 102 in its lower position, the unbalance is at the bottom of the part. Assuming that switches 92 and 102 remain in the illustrated position, switch 110 adjusts the level of the signal appearing at potentiometer 62 by a factor of ten from the upper contacts to the middle contacts and by a second factor of ten from the middle contacts to the lower contacts.

Referring to FIG. 5, the control panel 130 also includes an on-off switch 132, a pilot light 134, a drive-coast-brake motor control switch 134 and a drive diameter switch 136. Switch 136 is a potentiometer calibrated directly in inches so that the diameter of the part driven by belt 42 can be dialed directly into the potentiometer 136 to control the speed of motor 34 so that the part rotates at the predetermined speed of 720 r.p.m., for example. Meter 78 has its scale 140 calibrated directly in ounces and has ten divisions from 0 to 1 ounce full scale. The radius correction potentiometer 62 is calibrated directly in inches and is used where the radius of rotor 30 at the point where weights are to be added in the selected correction plane is known. However, with potentiometer 62 set to "1 inch" (wiper 119 across both resistors 117, 118), meter 78 reads directly in inch-ounces. As the correction radius is dialed into potentiometer 62, the signal developed at wiper 119 is reduced accordingly so that the meter 78 reads the weight, directly in ounces, to be added at the selected correction radius. The control panel 130 also includes a right angle memory dial 142 and a left angle memory dial 144. Dials 142, 144 are to record the unbalance angles, i.e., the angular position of a reference mark on the part during a strobe operation. When the part is stopped, the reference mark on the part is then reset to this particular position so that the heavy spot is positioned at the top or bottom of the part depending on the position of switch 102. Meter 78 has an indicating needle 145, a left weight memory needle 146 and a right weight memory needle 148. Needles 146, 148 are manually set by knobs 150, 152 at the deflection of the indicating needle 145 to record the weight to be added in the two correction planes. The wiper 139 of potentiometer 68 is set by means of a manually operated knob 141 and a scale 143 calibrated directly in pounds.

Referring to FIG. 7, in the preferred embodiment, the part-weight potentiometer 68 is calibrated with a high scale from 30 to 300 pounds and a low scale from 3 to 30 pounds. When using the low scale, the meter scale switch 110 is set as illustrated in FIG. 7 so that the three attenuating factors of 0.1, 1 and 10 on a disc 156 are viewable through the illustrated cutout on the dial. When the part weight is in the range of 30 to 300, disc 156 is rotated counterclockwise by a lever 158 so that the attenuation factors of 1, 10 and 100 are viewable through the cutout. With the lever 158 set on the low scale as illustrated and the switch 110 set to the numeral "1" position, wipers 112, 114, 116 will engage their middle contacts and the full scale deflection on meter 78 will be 1 ounce. The gain of the circuit, for example, the gain of amplifier 66 or other amplifiers (not shown) included in the circuit, is selected so that meter 78 reads directly in ounces even though the weight is set in pounds on the potentiometer 68. On the low weight scale (lever 158 in the position illustrated) switch 110 may be set on the "10" position for a full scale reading of 10 ounces with wipers 112, 114, 116 on their lower contacts. Where the weight of the part is in the range of 30 to 300 pounds, the disc 156 is shifted counterclockwise so that the corresponding full scale deflections of meter 78 will then be 1 ounce, 10 ounces or 100 ounces depending upon the setting of the selector switch 110.

More particularly, it can be shown that the gain of the circuit of FIG. 4, including the variable factors introduced by the meter scale switch 110, the radius correction potentiometer 117 and the part weight potentiometer 68, follows a known balancing principle illustrated schematically in FIG. 8 for a thin disc 154 having a geometrical center 155 and a mass center 157. With disc 154 supported on a soft suspension system such as carriers 20, the disc will revolve on the mass center 157 so that the geometrical center 155 revolves about mass center 157 on a path 159 shown in dotted lines. With disc 154 in the vertical plane of the carrier 20, the total peak-to-peak displacement 161 of the carrier 20 is twice the distance between the mass center 157 and the geometrical center 155. Hence the displacement 161 divided by a factor of two is the distance between the mass center and the geometrical center. For a thin disc, this distance in inches multiplied by the weight of the disc 154 in ounces yields the amount of unbalance in disc 154 in ounce-inches. For a long part such as rotor 30, it can also be shown that one-half the carrier displacement in inches is the distance in inches between the geometrical axis and a principal inertia axis (which generally corresponds to the mass center 157 of a thin disc) which when multiplied by the weight (in ounces) of the rotor 30 supported on the carrier yields the amount of unbalance in ounce-inches in the correction plane at the carrier. Hence with the potentiometer 62 set for one inch, the gain of the circuit of FIG. 4 is such as to divide the displacement of carrier 20 by two and perform the required multiplication, including conversion of the weight in pounds set on potentiometer 68 to ounces at meter 78.

FIG. 6 illustrates the preferred locking mechanism mounted in each stanchion 10, 12 to selectively hold carriers 20 against translation. The illustrated locking mechanism is described in greater detail in my copending application filed concurrently with the present application and entitled "Cable Suspension System for Balancing Machines." Although this locking mechanism is preferred, other types of carriage locks can also be used. A pin 160 pivotally fastened in the bottom of carriage 20 projects downwardly into the inside of stanchion 10 for engagement with jaws 162, 164. The jaws 162, 164 are pivoted on stanchion 10 by a pivot pin 166, and the lower ends of jaws 162, 164 are connected together and to the operating lever 50 by a toggle linkage comprising links 168, 170. The links 168, 170 are pivoted on the lower ends of their respective jaws 162, 164 with their inner ends pivoted together on the lever 50. Lever 50 is in turn pivotally fastened to the stanchion 10 by the pin 172. With the locking mechanism in the position illustrated, the pin 160 and hence the carriage will be locked against lateral translation and also against vertical displacement. However, as previously noted, the upper end of the pin 160 (not shown) is journalled in the carrier 20 and hence the carrier is free to pivot on pin 160 during translation of the other free carrier 20. To release pin 160, lever 50 is depressed, pivoting the links 168, 170 upwardly as illustrated in dotted lines to pull in the lower ends of the jaws 162, 164 and open the jaws. Pin 160 and carriage 20 are then free to translate during vibratory motion of the rotor 30. With the linkage illustrated, when the lever 50 is raised, jaws 162, 164 clamp pin 160 before links 168, 170 reach their aligned center position. Slight further raising of lever 50 causes the links 168, 170 to move downwardly over center placing the links 168, 170 and the jaws 162, 164 in compression to maintain the locking arrangement in the locked position.

For force unbalance correction using the balancing machine and electrical circuit described hereinabove, the rotor 30 is first weighed and placed on the bearing carriages 20. Drive arm 36 is operatively positioned as illustrated in FIGS. 1–3. Both of the carriages are unlocked for free translation (levers 50 are depressed) and one-half of the weight of the part is set on the part weight potentiometer 68. In setting the weight of the part on potentiometer 68, assuming that the part weighs 200 pounds, then half of this weight or 100 pounds is set using the high scale for potentiometer 68. Since the high scale is being used, the lever 158 is rotated counterclockwise so that the meter scale sensitivity can be set to either a full scale deflection corresponding to 1 ounce, 10 ounces or 100 ounces. The selector switch 92 is set to the "sum" position with wipers 94, 96, 98 engaged with their middle contacts. The radius at which weight is to be added in the correction planes (in the vertical planes of the carriers 20) is set on the correction radius potentiometer 62. For example, if the configuration of the part is such that weights are to be added at a radius of 2 inches in the correction planes, then the correction radius potentiometer 62 is set to "2" inches. The drive diameter potentiometer 136 is adjusted to the part diameter engaged by belt 42 so that the part will rotate at the desired r.p.m., for example, at 720 r.p.m. Preferably, the r.p.m. of the part is checked by moving switch 74 to connect the strobe trigger circuit 80 to the oscillator 84. Oscillator 84 generates a test signal of 12 cycles per second so that when the part is rotated the strobe light should stop a reference mark previously placed on the rotor 30. If the reference mark is not stopped by the strobe light 82, then the drive diameter potentiometer 136 is adjusted to stop the reference mark.

When the part is rotated, the output signals developed by pickups 31, 31' are connected in series via lead 122, wiper 96, its associated middle contact and lead 90 across the meter scale switch 110. Any force unbalance will then be indicated directly in ounces on meter 78. The sensitivity of the meter is selected to obtain a reading by operating meter scale switch 110. Therefore, the meter reading in ounces must be multiplied by one of the factors 1, 10 or 100 depending on where switch 110 is set. Typically, the unbalance can be expected to be in a given range of say one percent of the weight of the part. While the part is rotating, switch 74 is set to the strobe position illustrated in FIG. 4 and the strobe is triggered in a generally conventional manner to locate the angular position of the reference mark. As stated earlier, the phase shift introduced in 70 is preset at the factory so that the strobe fires with the unbalance at the top of the rotor or the bottom of the rotor depending on the position of switch 74. Because pickups 31, 31' are connected in series during the force unbalance mode of operation, any moment unbalance is balanced out in the series connection of the pickup carriers 31, 31' and will have no effect on the force unbalance measurements. Depending on the part under test, it may be known in advance whether any significant force unbalance can be expected. Certain parts need only be tested for moment unbalance or a combination of force and moment unbalance.

To correct for moment unbalance or a combination of force and moment unbalance, the part is tested first with one of the carriers 20 locked against translation while readings are obtained from the other free carrier. The other carrier is then locked against translation while the readings are obtained from the first carrier. For purposes of illustration, it is assumed that the right-hand carrier 20 on stanchion 10 is first locked against translation by raising its corresponding locking lever 50 on stanchion 10. Selector switch 92 is set to the "left" position to obtain measurements for correction in the left correction plane at the carrier on stanchion 12. The weight of the part at the left correction plane, i.e., the weight on the left carriage 20, is then set on potentiometer 68. For accurate balancing, this weight is determined separately for the right and left correction planes, i.e., for the weights at the respective carriers 20 on the stanchions 10 and 12. For many parts, a skilled operator can set the correction planes and the location of the carriers 20 so that reasonably accurate balancing can be achieved by merely setting potentiometer 68 at one-half of the total weight of the part, particularly where the part is symmetrical about its longitudinal midpoint. The radius at which weights are to be added in the correction plane is also set on the correction radius potentiometer 62.

Assuming that the speed of motor 34 has been properly adjusted to 720 r.p.m., when the part is rotated any moment unbalance causes the rotor to vibrate developing an output signal at the pickup 31. The selector switch 92 having been previously set to the "left" position as illustrated in FIGS. 4 and 5, wipers 94, 96, 98 are in the position illustrated in FIG. 4 and the signal developed across resistor 86 is applied through switches 102, 110 across the correction radius potentiometer 62 to provide a direct indication in ounces on the meter 78. The left meter needle 146 is then set at this deflection to remember the weight that must be added in the left correction plane. The angular position of the reference mark on the part noted by means of the strobe is set on dial 144.

Measurements are then taken for a correction in the right correction plane by locking carriage 20 on the stanchion 12 against translation while the carriage 20 on the stanchion 10 is free. The selector switch 92 is moved to its "right" position so that the wipers 94, 96, 98 engage their lower respective contacts to thereby connect the output from pickup 31' across the phase correction switch 102. Unless the operator is using one-half of the total weight of the part as described hereinabove, the operator readjusts the part weight potentiometer 68 corresponding to the exact weight of the part on the carrier 20 of the right stanchion 10. The radius at which weights can be added in the right correction plane is entered on the correction radius potentiometer 62 so that the meter 78 will provide a direct readout in ounces. The part is then rotated and the corresponding weight indication determined from meter 78 is set on the weight memory needle 148 by the knob 152. The unbalance angle is determined during the strobing operation and set on the right unbalance angle memory dial 142. The measured weights are then added (or removed) to the part at the proper correction angles. As in conventional balancing techniques, the above procedures can be repeated to more accurately balance the part if required.

Although the balancing machine has been described hereinabove for unbalance correction in correction planes located at the plane of the two carriers 20, corrections can be made in other planes based on the weight indications obtained from meter 78. For example, if the correction plane is selected to be, for example, one-quarter of the distance between the carrier in a direction to the left of the right carrier 20 on the right stanchion 10, then the resulting weight indication read from meter 78 would be multiplied by the fraction of four-thirds. Although the balancing machine has been described hereinabove utilizing the correction radius potentiometer 62, potentiometer 62 can be set for a correction radius of 1 inch and the reading on meter 78 will be in ounce-inches rather than ounces. Hence the weight can be added at any correction radius by suitable calculations. The high and low weight scales on the part weight potentiometer 68 coupled with the meter scale selection switch 110 provide a versatile balancing machine capable of handling parts over a wide weight range. The operator is only required to multiply the weight indicated on meter 78 by the appropriate factor set on the weight scale switch 110.

It will be understood that the balancing machine with direct readout has been described hereinabove for purposes of illustration and is not intended to indicate limits of the present invention, the scope of which is defined by the following claims.

I claim:

1. In a balancing machine wherein a part to be balanced is supported for rotation about an axis and unbalance of said part in terms of a parameter that is either a first weight-length parameter or a second weight parameter is to be determined at a first plane generally perpendicular to said axis, the combination comprising first transducer means responsive to translation of said part in said plane to provide a first electrical output signal representing the amount of displacement of said part in said plane, visual indicating means responsive to predetermined input signal levels to provide an indication of said unbalance directly in units of one of said parameters, and signal processing circuit means coupling said output signal from said transducer means to said visual indicating means to vary said output signal and provide said predetermined signal levels, said circuit means comprising first manually variable impedance means having a visual scale calibrated in units of weight correlated to units of said impedance, said circuit means having a predetermined gain such that when said first impedance means is manually set by means of said units on said visual scale to the weight of said part in said plane said visual indication means indicates said unbalance directly in units of said one parameter.

2. The balancing machine set forth in claim 1 wherein said visual indication means has an indicating scale calibrated in units of weight-length and said gain is such that said indicating means provides a visual indication directly in weight-length units when said first impedance means is set by means of its visual scale to the weight of said part in said plane.

3. The balancing machine set forth in claim 1 wherein said part is supported for translation in a second predetermined plane generally perpendicular to said axis to determine an unbalance of said part in said second plane in terms of said one parameter and said balancing machine further comprises second transducer means responsive to translation of said part in said second plane to provide a second electrical output signal representing the amount of displacement of said part in said second plane, a manually operable selector switch having a first pair of input terminals coupled to said first transducer means, a second pair of input terminals coupled to said second transducer means and a pair of output terminals, said switch also having contacts therein arranged and disposed so as to selectively connect said first pair of input terminals to said output terminals or said second pair of input terminals to said output terminals, and wherein said output terminals are coupled to said visual indicating means so that said visual indicating means can selectively indicate said one parameter for said first plane or for said second plane in accordance with the position of said switch.

4. The balancing machine set forth in claim 3 wherein said switch further comprises further contacts arranged to sum output signals at said first and said second transducers and provide at said output terminals of said switch a signal which varies as a function of said sum.

5. The balancing machine set forth in claim 3 wherein each of said output signals from said transducer means has a predetermined phase relationship correlated to the direction of displacement of said part in the respective plane and wherein said circuit means further comprises phase shift means for varying the phase of at least one of said output signals by 180 degrees.

6. The balancing machine set forth in claim 3 further comprising first locking means for selectively restraining translation of said part in said first plane and second locking means for selectively restraining translation of said part in said second plane.

7. The balancing machine set forth in claim 1 wherein said circuit means further comprises indicator scale switch means for varying the level of said signal at said visual indicating means by a predetermined factor so that said indication of units of said one parameter can be varied according to said factor.

8. The balancing machine set forth in claim 1 wherein said first impedance means comprises a potentiometer having first and second input terminals, a resistor connected across said terminals, and an output wiper and wherein said output wiper is operatively associated with said resistor at positions directly correlated to said units of weight on said visual scale of said first variable impedance means.

9. In a balancing machine wherein a part to be balanced is supported for rotation about an axis and unbalance of said part in terms of a parameter that is either a first weight-length parameter or a second weight parameter is to be determined at a first plane generally perpendicular to said axis, the combination comprising first transducer means responsive to translation of said part in said plane to provide a first electrical output signal representing the amount of displacement of said part in said plane, visual indicating means responsive to predetermined input signal levels to provide an indication of said unbalance directly in units of one of said parameters, and signal processing circuit means coupling said output signal from said transducer means to said visual indicating means to vary said output signal and provide said predetermined signal levels, said circuit means comprising first manually variable impedance means having a visual scale calibrated in units of weight correlated to units of said impedance, said circuit means having a predetermined gain such that when said first impedance means is manually set by means of said units on said visual scale to the weight of said part in said plane said visual indication means indicates said unbalance directly in units of said one parameter, and wherein said one parameter is said second parameter, and said part has a predetermined location in said plane at which the weight of said part can be varied to balance said part, said predetermined location being spaced from a geometrical center of said part by a predetermined length and wherein said circuit means further comprises second manually variable impedance means having a second visual scale calibrated in units of length correlated to units of said second impedance so that when said predetermined length is set in units on said second scale said visual indicating means provides a direct indication in weight units of the variation in weight required at said predetermined location to balance said part.

10. The balancing machine set forth in claim 9 wherein said first impedance means comprises a potentiometer having first and second input terminals, a resistor connected across said terminals, and an output wiper and wherein said output wiper is operatively associated with said resistor at positions directly correlated to said units of weight on said visual scale of said first variable impedance means.

11. The balancing machine set forth in claim 9 wherein said second impedance means comprises a potentiometer having first and second input terminals, a resistor connected across said terminals and an output wiper, and wherein said output wiper is operatively associated with said resistor at positions directly correlated to said units of length on said second visual scale.

12. In a balancing machine wherein a part to be balanced is supported between a first carrier and a second carrier spaced apart along the rotational axis of said part and wherein unbalance of said part causes said part to translate at a first predetermined plane passing through said first carrier generally perpendicular to said axis and at a second predetermined plane passing through said second carrier generally perpendicular to said axis, said part has a first predetermined location in said first plane at which the weight of said part can be varied to balance said part, said first position is spaced from a geometrical center of said part by a first predetermined length, said part has a second predetermined location in said second plane at which the weight of said part can be varied to balance said part, and said second predetermined location is spaced from said geometrical center by said second predetermined length, the improvement comprising means for indicating directly the amount of weight variation required at said first and said second positions to balance said part comprising first transducer means responsive to translation of said part in said first plane to provide a first electrical output signal representing the amount of displacement of said part in said first plane, second transducer means responsive to translation of said part in said second plane to provide a second electrical output signal representing the amount of displacement of said part in said second plane, a selector switch operatively coupled to said first and said second transducer means to selectively develop a first intermediate output signal at output terminals of said switch means that varies as a function of displacement in one of said planes, first and second respective potentiometers serially coupled together and operatively coupled to said output terminals of said switch means to develop a second intermediate signal that varies as a function of said first intermediate signal, each of said first and said second potentiometers being manually adjustable to vary the level of said second intermediate signal, and visual indicating means calibrated in units of weight-length and responsive to said second intermediate signal, and wherein one of said potentiometers has a first visual scale calibrated in units of weight directly correlated to resistance units of said one potentiometer and the other potentiometer has a second visual scale calibrated in units of length directly correlated to resistance units of said other potentiometer so that when the weight of said part on said carrier in said one plane is set on said first scale and said predetermined length in said one plane is set on said second scale, said indicating means directly indicates the variation in weight required in said one plane at the predetermined location.

13. In combination a part to be balanced and a balancing machine wherein said part is supported for rotation about an axis and unbalance of said part in terms of a parameter that is either a first weight-length parameter or a second weight parameter is to be determined at a first plane generally perpendicular to said axis, said balancing machine further comprising first transducer means responsive to translation of said part in said plane to provide a first electrical output signal representing the amount of displacement of said part in said plane, visual indicating means responsive to predetermined signal levels to provide an indication of said unbalance directly in units of one of said parameters, and circuit means coupling said output signal of said transducer to said visual indicating means comprising a first manually variable impedance means provided with a scale calibrated in units of weight correlated to units of said impedance, said first impedance means being manually set to a predetermined unit of said scale representing the weight of said part in said plane so that said visual indication means indicates said unbalance directly in units of said one parameter.

14. The balancing machine set forth in claim 13 wherein said impedance means comprises a potentiometer having an output wiper and wherein positions of said wiper in said potentiometer are correlated directly to units of weight on said scale.

15. In the method of balancing different parts having different weights without using trial weights to calibrate visual indicating means for each different part and wherein balancing is performed on a machine that supports a part for rotation about an axis and unbalance of a part is determined at a first plane substantially perpendicular to said axis by sensing translation of said part in said plane, developing an electrical signal representing said displacement, feeding said signal to said visual indicating means through circuit means having a first manually variable impedance means which in turn has a visual scale designated in units of weight, the steps of providing a gain for said circuit so that unbalance is indicated directly at said indicating means when a weight of a part at said plane is set on said impedance means, determining a first weight of a first one of said parts at said plane, setting said impedance at a designated position on said scale representing said first weight of said first part, rotating said first part while reading unbalance on said indicating means directly without adding a trial weight or the like to said first part, removing the first part from said machine, and then determining a second weight of a second part at said plane, setting said impedance at a designated position on said scale representing said second weight of said second part, rotating said second part and reading unbalance on said indicating means directly without adding a trial weight or the like to said second part.

References Cited

UNITED STATES PATENTS

| | | | |
|---|---|---|---|
| 2,740,298 | 4/1956 | Swearingen | 73—478 |
| 2,823,544 | 2/1958 | McCoy | 73—466 |
| 3,211,009 | 10/1965 | Lucka | 73—462 |
| 3,452,603 | 7/1969 | Kaiser et al. | 73—466 |

JAMES J. GILL, Primary Examiner

U.S. Cl. X.R.

73—466